(12) United States Patent
Minamitani

(10) Patent No.: US 10,957,954 B2
(45) Date of Patent: Mar. 23, 2021

(54) ELECTROCHEMICAL DEVICE

(71) Applicant: Showa Denko Packaging Co., Ltd., Isehara (JP)

(72) Inventor: Koji Minamitani, Minato-ku (JP)

(73) Assignee: SHOWA DENKO PACKAGING CO., LTD., Kanagawa (JP)

(*) Notice: Subject to any disclaimer, the term of this patent is extended or adjusted under 35 U.S.C. 154(b) by 129 days.

(21) Appl. No.: 14/702,920

(22) Filed: May 4, 2015

(65) Prior Publication Data

US 2015/0325819 A1 Nov. 12, 2015

(30) Foreign Application Priority Data

May 8, 2014 (JP) .............................. JP2014-096478

(51) Int. Cl.
*H01M 2/00* (2006.01)
*H01M 50/124* (2021.01)
*B32B 15/08* (2006.01)
*B32B 7/12* (2006.01)
*B32B 37/12* (2006.01)
*H01M 50/10* (2021.01)
(Continued)

(52) U.S. Cl.
CPC ............ *H01M 50/124* (2021.01); *B32B 7/12* (2013.01); *B32B 15/08* (2013.01); *B32B 37/12* (2013.01); *H01M 50/10* (2021.01); *H01M 50/116* (2021.01); *H01M 50/531* (2021.01); *H01M 50/555* (2021.01); *B32B 2457/10* (2013.01); *Y10T 156/10* (2015.01); *Y10T 156/1052* (2015.01)

(58) Field of Classification Search
CPC .... H01M 2/0287; H01M 2/26; H01M 2/0275; H01M 2/0277; H01M 2/0285; H01M 2/0215; H01M 2/0207; H01M 2/0262
See application file for complete search history.

(56) References Cited

U.S. PATENT DOCUMENTS

| 2002/0142178 A1* | 10/2002 | Yamashita | H01M 2/0275 428/461 |
| 2003/0059673 A1* | 3/2003 | Langan | H01M 2/0215 429/127 |

(Continued)

FOREIGN PATENT DOCUMENTS

| CN | 104972714 A | 10/2015 |
| JP | 2004-031272 A | 1/2004 |

(Continued)

OTHER PUBLICATIONS

Machine translation of JP 2004-031272, obtained Apr. 2, 2019 (Year: 2004).*

*Primary Examiner* — Nicholas P D'Aniello
(74) *Attorney, Agent, or Firm* — Keating and Bennett, LLP

(57) ABSTRACT

The electrochemical device 40 includes a device main body 60 and an armoring body 50 for accommodating the device main body 60. The armoring body 50 is constituted by a laminated armoring material in which a heat-resistant resin layer 2 is adhered to a first surface of a metal foil layer 4 and a thermal fusion resin layer 3 is adhered to a second surface of the metal foil layer 4, and metal exposed sections 54 and 56 in which the metal foil layer 4 is exposed is formed at least on the heat-resistant resin layer 2 side which is an outer side of the laminated armoring material 50.

6 Claims, 7 Drawing Sheets

(51) Int. Cl.
*H01M 50/116* (2021.01)
*H01M 50/531* (2021.01)
*H01M 50/555* (2021.01)

(56) References Cited

U.S. PATENT DOCUMENTS

2009/0081542 A1* 3/2009 Yageta .................... H01G 9/08
429/185
2015/0283790 A1 10/2015 Minamitani

FOREIGN PATENT DOCUMENTS

| | | |
|---|---|---|
| JP | 2005-276486 A | 10/2005 |
| JP | 2011-098759 A | 5/2011 |
| JP | 2013-243062 A | 12/2013 |
| WO | 2009/090930 A1 | 7/2009 |

* cited by examiner

ELECTROCHEMICAL DEVICE

BACKGROUND OF THE INVENTION

1. Field of the Invention

The present disclosure relates to an electrochemical device using a laminated armoring material as an armoring body and its related technologies.

2. Description of the Related Art

The following description of related art sets forth the inventor's knowledge of related art and certain problems therein and should not be construed as an admission of knowledge in the prior art.

In recent years, as mobile devices such as smartphones, tablet terminals, etc., are made thinner and lighter, as an armoring material for lithium ion secondary batteries or lithium polymer secondary batteries to be loaded in such mobile devices, in place of conventional metallic cans, a laminated material in which resin films are adhered to both surfaces of a metal foil is used. Further, in a power device such as a large-sized battery, a condenser, a capacitor, etc., used as an electric storage device for a hybrid vehicle/electric vehicle, a wind power generation plant, a solar power generation plant, or a nighttime electric equipment, it is being considered to use a laminated material as an armoring material.

In general, although a laminated armoring material is thinner, lighter, and easier in forming and sealing, and therefore easier in handling in comparison to a metallic can, in a case of being used as an armoring body for an electrochemical device, the metal face is never exposed outside. Therefore, the armoring body cannot be used as a conductor like in a dry battery. Therefore, in many cases, insulated tab leads are pulled out from the armoring body for wire connection by soldering, etc., and the battery itself is fixed to a substrate or a housing with an adhesive tape, etc.

In a laminated armoring material, since a metal foil is employed in the center of the layer, if the metal foil can be exposed by removing the resin layer, there is a possibility that it can be used as a conductor or a soldering section, etc.

As a technology for cutting only a resin layer without cutting a metal foil of a laminated armoring material, in a packaging bag for packaging food products or pharmaceutical tools in a sealed state, there is an easy-to-open packaging bag capable of being opened with one hand by forming a slit in the resin layer by laser processing or mechanical processing using a metal blade (see Patent Document 1: International Publication No. WO2009/090930).

The Patent Document 1 is directed to a technology for cutting a laminated armoring material in the cross-sectional direction to open a packaging bag, which cannot be employed for exposing a metal foil by removing a resin layer. Even if a laser is irradiated on a resin layer, a linear slit may be merely formed and the resin layer will not be removed in a plane shape, which does not cause an exposure of the metal foil having an area capable of being used for soldering. Further, it is very troublesome to reciprocate a laser to burn out a resin layer in a plane shape so that no resin remains. Therefore, it is difficult to expose the metal foil of the laminated armoring material in a plane shape for use as a conductor or a soldering section of an electrochemical device.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The embodiments of the present disclosure have been developed in view of the above-mentioned and/or other problems in the related art. The embodiments of the present disclosure can significantly improve upon existing methods and/or apparatuses.

The present disclosure has been made in view of the aforementioned technical background, and aims to provide an electrochemical device which has a metal exposed section in which a metal layer is exposed in a plane shape at a portion of a laminated armoring material constituting an armoring body and is capable of utilizing the metal exposed section as a soldering section or a conductive section, and also aims to provide its related technologies.

(1) According to a first aspect of the present invention, in some embodiments of the present disclosure, an electrochemical device includes:

a device main body; and an armoring body accommodating the device main body, wherein the armoring body is constituted by a laminated armoring material in which a heat-resistant resin layer is adhered to a first surface of a metal foil layer and a thermal fusion resin layer is adhered to a second surface of the metal foil layer, and a metal exposed section in which the metal foil layer is exposed is formed at least on the heat-resistant resin layer side which is an outer side of the laminated armoring material.

(2) In some embodiments of the present disclosure, in the electrochemical device as recited in the aforementioned Item 1, the metal exposed section is formed on both surfaces of the metal foil layer as a conductive section, and in the armoring body, at least one of electrodes of a positive electrode and a negative electrode of a device main body is connected to the conductive section.

(3) In some embodiments of the present disclosure, in the electrochemical device as recited in the aforementioned Item 2, an inside of the armoring body is decompressed.

(4) In some embodiments of the present disclosure, in the electrochemical device as recited in the aforementioned Item 2 or 3, the at least one of electrodes of the device main body and the conductive section of the armoring body are joined by ultrasonic joining.

(5) In some embodiments of the present disclosure, in the electrochemical device as recited in any one of the aforementioned Items 2 to 4, the metal exposed section on the heat-resistant resin layer side and the metal exposed section on the thermal fusion resin layer side are formed at the same position sandwiching the metal foil layer.

(6) In some embodiments of the present disclosure, in the electrochemical device as recited in any one of the aforementioned Items 1 to 5, the heat-resistant resin layer of the laminated armoring material is constituted by a stretched film and the thermal fusion resin layer is constituted by an unstretched film.

(7) In some embodiments of the present disclosure, in the electrochemical device as recited in any one of the aforementioned Items 1 to 6, a chemical conversion film is formed on a surface of the metal foil layer at least on a side of the thermal fusion resin layer.

(8) According to a second aspect of the present invention, in some embodiments of the present disclosure, a method of producing a laminated armoring material for an armoring body for accommodating a device main body of an electrochemical device, includes:

adhering a first resin layer to a first surface of a metal foil layer via a first adhesive agent layer;

adhering a second resin layer to a second surface of the metal foil layer via a second adhesive agent layer; and removing a part of at least one of the first resin layer and the second resin layer, wherein the at least one of the first resin layer and the second resin layer is adhered to the metal foil layer via one of the first adhesive agent layer and the second adhesive agent layer formed by applying an adhesive agent to a joining region of the metal foil layer and the at least one of the first resin layer and the second resin layer excluding a part of the joining region so that an adhesive agent unapplied section in which the adhesive agent is not applied is formed, and wherein the part of at least one of the first resin layer and the second resin layer corresponds to the adhesive agent unapplied section, and is removed to expose the metal foil layer.

(9) In some embodiments of the present disclosure, in the method of producing the laminated armoring material as recited in the aforementioned Item 8, as an adhering method on a side of the first surface of the metal foil layer and an adhering method on a side of the second surface of the metal foil layer, a process for forming the adhesive agent unapplied section is employed to produce a laminated body for a laminated armoring material having the adhesive agent unapplied section on each of both surfaces of the metal foil layer.

(10) In some embodiments of the present disclosure, in the method of producing the laminated armoring material as recited in the aforementioned Item 8 or 9, in a process for forming the adhesive agent unapplied section, the adhesive agent is applied using a roll having a concave portion and a convex portion on a peripheral surface of the roll to form the adhesive agent unapplied section corresponding to a shape of the convex portion.

(11) In some embodiments of the present disclosure, in the method of producing the laminated armoring material as recited in any one of the aforementioned Items 8 to 10, the resin layer is cut and removed by irradiating a laser in a process for removing the part of at least one of the first resin layer and the second resin layer.

(12) According to a third aspect of the present invention, in some embodiments of the present disclosure, a laminated sheet armoring material is produced by the method as recited in any one of the aforementioned Items 8 to 11.

According to the electrochemical device as recited in Item (1), on an outer surface of the armoring body, a metal exposed section in which a metal layer of a laminated armoring material is exposed is formed, and therefore the metal exposed section can be used as a soldering section.

According to the electrochemical device as recited in Item (2), metal exposed sections formed on both surfaces of the laminated armoring material act as conductive sections, and the conductive section for connecting the device main body is formed as a portion of the armoring body, and therefore electricity can be conducted without using a tab lead. By eliminating a tab lead, the electrochemical device itself can be made lighter and smaller, and also, by reducing the connection space for connecting to the electrochemical device and another device, the device in which an electrochemical device is loaded can be made smaller. Further, like a dry battery, an easy attachment method in which the electrochemical device is fitted in a holder can be employed. Further, by not using a tab lead, the producing cost of the electrochemical device can be reduced.

According to the electrochemical device as recited in Item (3), since an inside of the armoring body is decompressed, an electrode of the device main body is pressed against the conductive section of the armoring body, and therefore it is less likely to be separated, thereby making the electric conduction more certain.

According to the electrochemical device as recited in Item (4), since the device main body and the conductive section of the armoring body are connected by ultrasonic joining, pinholes and/or burrs are less likely to occur at the joining section.

According to the electrochemical device as recited in Item (5), the metal exposed section on the heat-resistant resin layer side and the metal exposed section on the thermal fusion resin layer side are formed at the same position sandwiching the metal foil layer, and for example, since the ultrasonic vibration applied from the outer side when performing an ultrasonic joining of the conductive section and the device main body can be transmitted directly to the joining section, the joining efficiency is excellent.

According to the electrochemical device as recited in Item (6), since the heat-resistant resin layer forming the outer surface of the armoring body is constituted by a stretched film and the thermal fusion resin layer forming the inner surface is constituted by an unstretched film, the outer surface of the armoring body has excellent formability and strength, and the inner surface has high chemical resistance and excellent heat-sealing characteristics.

According to the electrochemical device as recited in Item (7), since a chemical conversion film is formed on a metal layer of the laminated armoring material constituting the armoring material, it is excellent in corrosion resistance.

According to the method of producing a laminated armoring material as recited in Item (8), since an adhesive agent unapplied section forming and adhering process is employed at least for adhering the first surface of the metal foil layer and the heat-resistant resin layer, a laminated body for a laminated armoring material in which the metal foil layer and the heat-resistant resin layer are adhered together by an adhesive agent layer including an adhesive agent unapplied section can be obtained.

Also, in the resin layer removal process, when a part of the heat-resistant resin layer corresponding to the adhesive agent unapplied section is removed from the laminated body for a laminated armoring material, a laminated armoring material having a metal exposed section in which the metal foil layer is exposed can be obtained. At the adhesive agent unapplied section, since the heat-resistant resin layer is not joined to the metal foil layer and the adhesive agent is not interposed therebetween, by removing the heat-resistant resin layer, the metal foil layer can be assuredly exposed without causing a remained adhesive agent. The produced laminated armoring material can be used in an electrochemical device as an armoring body material having a metal exposed section.

According to the method of producing the laminated armoring material as recited in Item (9), since an adhesive agent unapplied section forming and adhering process is employed for both the first surface and the second surface of the metal foil layer, a laminated body for a laminated armoring material, in which adhesive agent unapplied sections are formed on both surfaces, can be obtained. Further, by performing a resin layer removal process on both surfaces of the laminated body for a laminated armoring material, the metal exposed section can be formed on both surfaces of the metal foil layer. The produced laminated armoring material can be used as an armoring material of an electrochemical device, in which the metal exposed section can be used as a conductive section.

According to the method of producing the laminated armoring material as recited in Item (10), in the adhesive agent unapplied section forming and adhering process, the adhesive agent unapplied section corresponding to the shape of a convex portion can be formed.

According to the method of producing the laminated armoring material as recited in Item (11), since the resin layer is cut and removed by irradiating a laser, it is possible to cut only a film without causing burrs with a predetermined irradiation output.

According to the laminated armoring material as recited in Item (12), it can be suitably used as an armoring body material for an electrochemical device.

BRIEF DESCRIPTION OF THE DRAWINGS

The disclosed embodiments of the present invention are shown by way of example, and not limitation, in the accompanying figures.

EMBODIMENTS FOR CARRYING OUT THE INVENTION

Figure 1A:
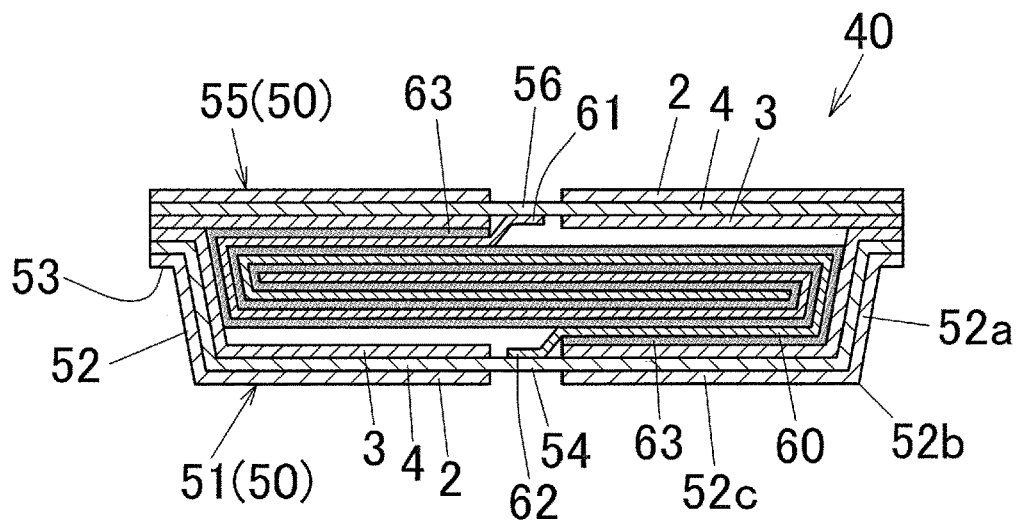
FIG. 1A is a cross-sectional view showing a first laminated armored battery according to an embodiment of an electrochemical device of the present invention.

In the following paragraphs, some embodiments of the invention will be described by way of example and not limitation. It should be understood based on this disclosure that various other modifications can be made by those in the art based on these illustrated embodiments.

[Electrochemical Device]

FIG. 1A to FIG. 3 show three types of laminated armored batteries 40, 41, and 42. These laminated armored batteries 40, 41, and 42 are embodiments of an electrochemical device of the present invention, and each is equipped with a bare cell 60 and 65 and an armoring body 50, 70, and 80 for accommodating the bare cell 60 and 65. The bare cells 60 and 65 correspond to the device main body of the present invention. Further, the members 51, 55 and 72 constituting the armoring bodies 50, 70 and 80 are made by cutting the laminated armoring material 1 and 11 shown in FIG. 4A and FIG. 4B into desired dimensions, or further processing them.

<First Laminated Armored Battery (Armoring Body Having Concave Portion)>

Figure 1B:
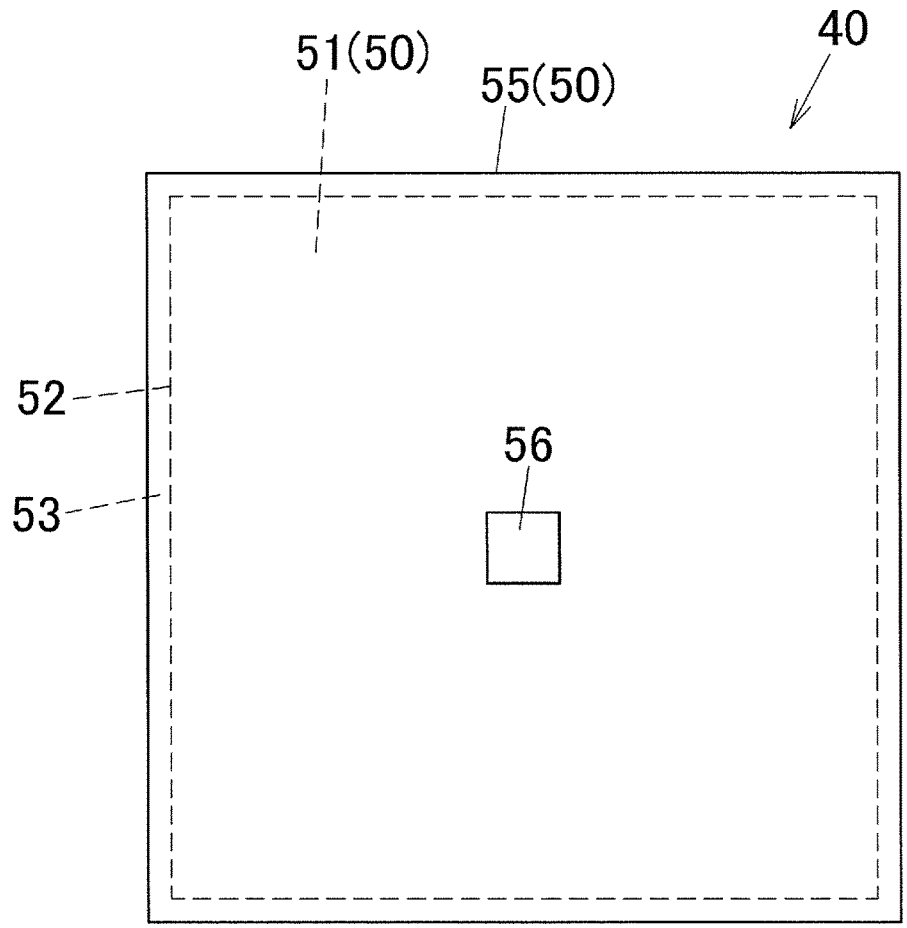
FIG. 1B is a planar view of the first laminated armored battery of FIG. 1A.

As shown in FIG. 1A and FIG. 1B, the armoring body 50 of the first laminated armored battery 40 is produced by assembling a main body 51 having a concave portion 52 having an angular shape in a planar view and a flange 53 outwardly extending from the opening edge of the concave portion 52, and a cover plate 55 having the same dimension as the dimension of the perimeter of the flange 53 of the main body 51. The concave portion 52 forms a storage space of the bare cell 60.

Figure 4A:
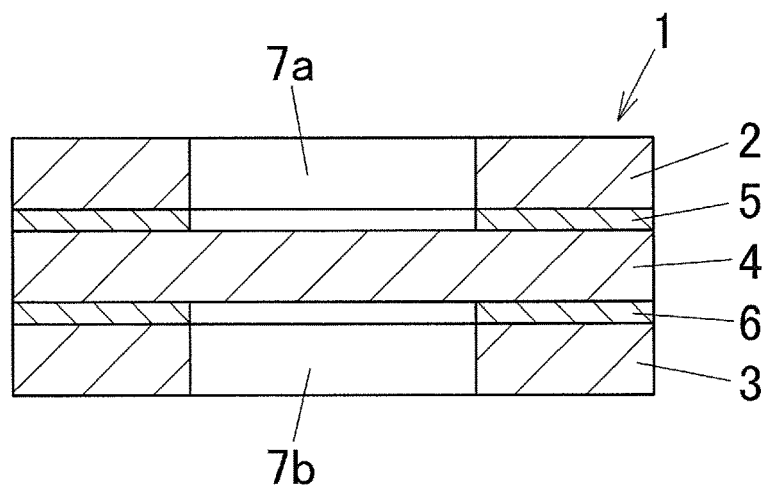
FIG. 4A is a cross-sectional view showing a laminated armoring material having metal exposed sections on both surfaces.

The main body 51 of the armoring body 50 is made by subjecting a flat-sheet like laminated armoring material 1 in which resin layers 2 and 3 are adhered to both surfaces of the metal foil layer 4 as shown in FIG. 4A to a plastic deformation work such as bulging or drawing to form the concave portion 52, and trimming the non-deformed section in the periphery of the concave portion 52 to the dimension of the perimeter of the flange 53. On the other hand, the cover plate 55 is made by cutting the flat sheet-like laminated armoring material 1 into a desired dimension. On the bottom surface of the concave portion 52 of the main body 51, a negative electrode conductive section 54 is provided, and a positive electrode conductive section 56 is provided on the cover plate 55. The metal foil layer 4 is made of a conductive material, and the positive electrode conductive section 56 and the negative electrode conductive section 54 are formed by the metal exposed sections 7a and 7b in which the metal foil layer 4 of the laminated armoring material 1 is exposed. The laminated armoring material 1 having the metal exposed sections 7a and 7b and the producing method thereof will be explained later.

In the bare cell 60, a sheet-like positive electrode 61 and a negative electrode 62 are laminated via a separator 63, and in the armoring body 50, the terminal end of the positive electrode 61 is connected to the positive electrode conductive section 56 and the terminal end of the negative electrode 62 is connected to the negative electrode conductive section 54.

The first laminated armored battery 40 is made by, after joining the positive electrode 61 and the negative electrode 62 of the bare cell 60 to their respective conductive sections 56 and 54, accommodating the bare cell 60 in the concave portion 52 of the main body 51 and covering with the cover plate 55, heat-sealing the resin layers 3 at the contact section of the flange 53 of the main body 51 and the cover plate 55 leaving an electrolytic liquid injection opening, and then sealing the armoring body 50 by heat-sealing the electrolytic liquid injection opening after injecting an electrolytic liquid.

Figure 2A:
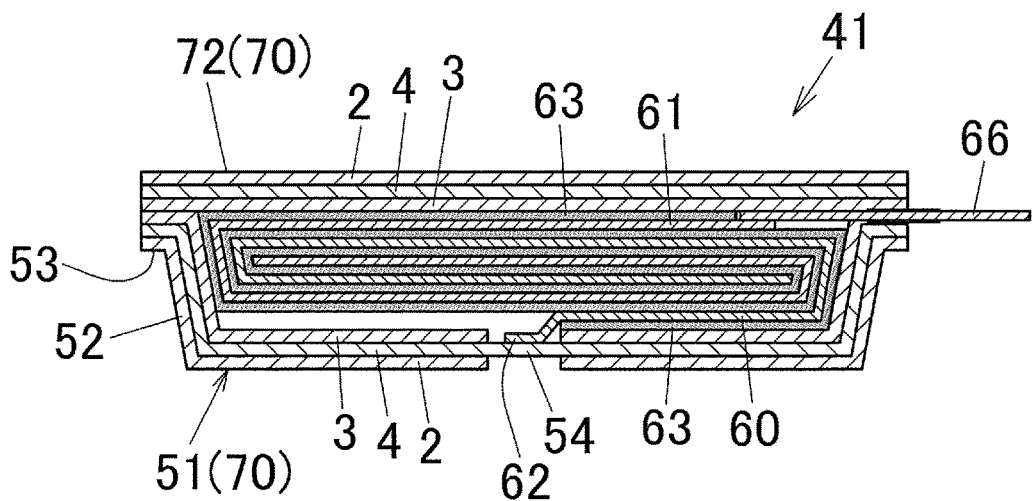
FIG. 2A is a cross-sectional view showing a second laminated armored battery according to another embodiment of an electrochemical device of the present invention.
Figure 3:
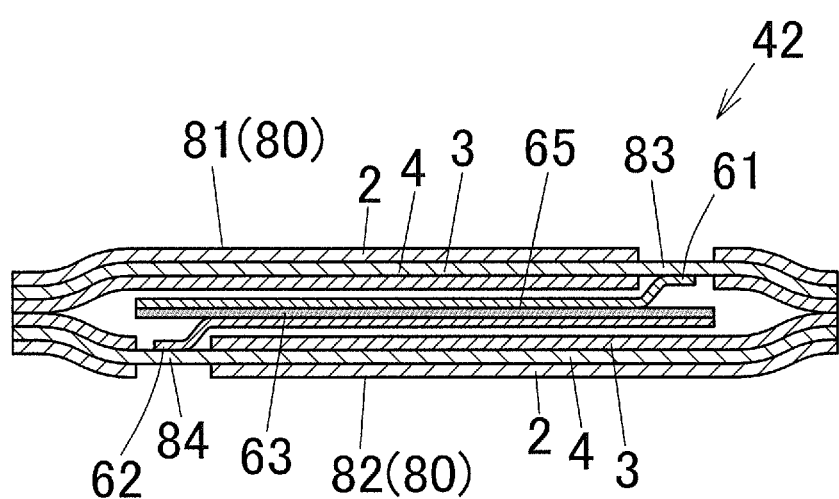
FIG. 3 is a cross-sectional view showing a third laminated armored battery of yet another embodiment of an electrochemical device of the present invention.

It is preferable that the injection of the electrolytic liquid and the heat-sealing of the injection opening are performed under decompression and that the inside of the armoring body is maintained in the decompressed state even after sealing. When the pressure inside the sealed armoring body 50 is reduced, the positive electrode 60 and the negative electrode 62 of the bare cell 60 are pressed against the conductive sections 56 and 54 of the armoring body 50, becoming less likely to separate, which results in more assured electrical conductance. It is preferable that the internal pressure of the armoring body 50 at 25° C. is less than 100 kPa. A more preferable internal pressure is 0.1 kPa (100 Pa) or lower and an even more preferable internal pressure is 0.03 kPa (30 Pa) or lower. Therefore, it is preferable that the injection of the electrolytic liquid and the heat-sealing of the injection opening are performed under the aforementioned pressure. Further, it is preferable that the heat-sealing operation under decompression is performed for armoring bodies having any shapes, and it is also performed on a bag-shaped armoring body 80 as shown in FIG. 3. Further, it is performed even in a case in which only one of the positive electrode 61 and the negative electrode 62 of the bare cell 60 is connected to the conductive section of the armoring body. FIG. 2A shows a case in which only the negative electrode 62 is connected to the conductive section 54.

<Second Laminated Armored Battery (Armoring Body Having Concave Portion)>

Figure 2B:
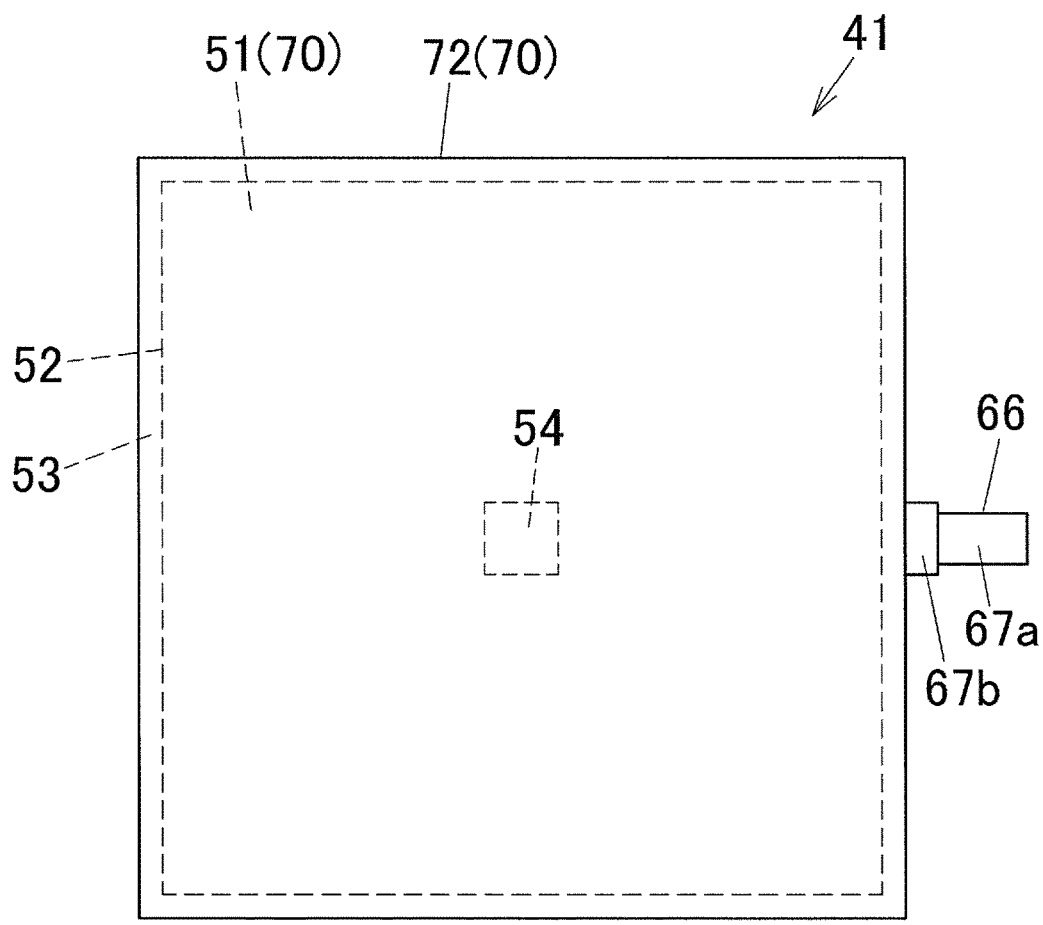
FIG. 2B is a planar view of the second laminated armored battery of FIG. 2A.
Figure 4B:
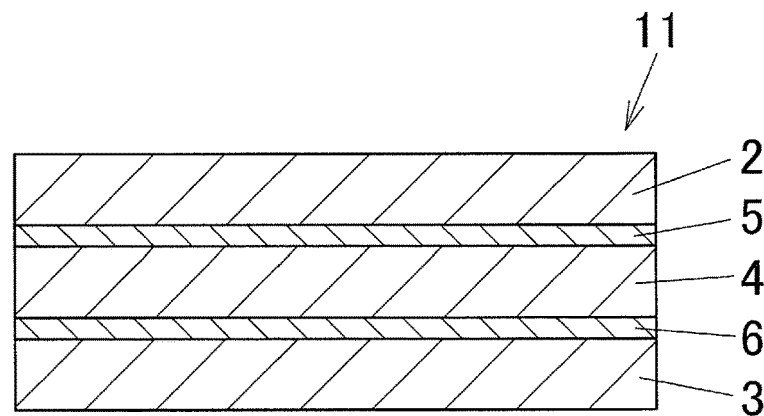
FIG. 4B is a cross-sectional view showing a laminated armoring material which does not have a metal exposed section.

As shown in FIGS. 2A and 2B the armoring body 70 of the second laminated armored battery 41 and the armoring body 50 of the first laminated armored battery 40 are common in a main body 51 having an negative electrode conductive section 54, but different in the laminated armoring material 11 constituting the cover plate 72. The cover plate 72 is constituted by a flat sheet of a laminated armoring material 11 which does not have a metal exposed section as shown in FIG. 4B. That is, the armoring body 70 has a negative electrode conductive section 54, but does not have a positive electrode conductive section.

Further, the bare cell 60 is the same as that of the first laminated armored battery 40. The end section of the negative electrode 62 of the bare cell 60 is connected to the negative electrode conductive section 54 of the main body 51 of the armoring body 70, and one end side of the positive electrode tab lead 66 is connected to the end section of the positive electrode 61.

In the second laminated armored battery 41, the negative electrode 62 of the bare cell 60 is connected to the negative electrode conductive section 54 of the main body 51 of the armoring body 70, and the bare cell 60 is accommodated in the concave portion 52. With the other end side of the positive electrode tab lead 66 connected to the positive electrode 61 arranged outside the flange 53, the cover plate 72 is covered. In the same manner as the first laminated armored battery 40, the flange 53 and the cover plate 72 are heat-sealed except for an electrolytic liquid injection opening, and the armoring body 70 is sealed by heat-sealing the electrolytic liquid injection opening after injecting an electrolytic liquid. The positive electrode tab lead 66 is pulled outside the armoring body 70.

<Third Laminated Armored Battery (Bag-Shaped Armoring Body)>

In the armoring body 80 of the third laminated armored battery 42 shown in FIG. 3, the laminated armoring material 1 of FIG. 4A is used in a flat sheet state without forming a concave portion, and it is formed into a bag shape by making a first sheet 81 and a second sheet 82 cut into the same dimensions facing each other and heat-sealing the periphery. In the first sheet 81 and the second sheet 82 constituting the armoring body 80, the positive electrode conductive section 83 and the negative electrode conductive section 84 using the metal exposed sections 7a and 7b of the laminated armoring material 1 are formed.

In the bare cell 65, a sheet like positive electrode 61 and a negative electrode 62 are laminated via a separator 63.

In the third laminated armored battery 42, the end section of the positive electrode 61 of the bare cell 65 is connected to the positive electrode conductive section 83 of the first sheet 81, and the end section of the negative electrode 62 is connected to the negative electrode conductive section 84 of the second sheet 82. Then, the first sheet 81, the bare cell 65 and the second sheet 82 are laminated in that order. The periphery of the first sheet 81 and the second sheet 82 is heat-sealed except for an electrolytic liquid injection opening, and the armoring body 80 is sealed by heat-sealing the electrolytic liquid injection opening after injecting an electrolytic liquid.

Among the aforementioned three laminated armored batteries, in the first laminated armored battery 40 and the third laminated armored battery 42, both the positive electrode conductive sections 56 and 83 and the negative electrode conductive sections 54 and 84 are formed on the armoring body 50 and 80, and the first laminated armored battery 40 and the third laminated armored battery 42 can be connected to other devices via these conductive sections 54 and 84 in a conductible manner. On the other hand, in the second laminated armored battery 41, only the negative electrode conductive section 54 is provided on the armoring body 70, and the connection with the positive electrode 61 is performed via the positive electrode tab lead 66 pulled out from the armoring body 70.

As a joining method of the positive electrode 61 and the positive electrode conductive sections 56 and 83, and the negative electrode 62 and the negative electrode conductive sections 54 and 84, adhesion by ultrasonic joining, soldering, and conductive adhesive agent can be exemplified. Among them, the ultrasonic joining is easy in joining operation and is recommended since pinholes and/or burrs are not likely to occur at the joining section even in a case in which a metal foil layer is used as an electrode of a bare cell and a conductive section of an armoring body. Further, the present invention does not limit the joining means of an electrochemical device and the conductive section of an armoring body to the aforementioned means. Further, the ultrasonic joining can be recommended as the joining means of an electrode of a bare cell and a tab lead.

In the laminated armored battery, since the conductive section connected to the bare cell is formed as a part of the armoring body, a tab lead can be eliminated. By forming at least one conductive section in the armoring body, at least one of the tab lead for the positive electrode and the tab lead for the negative electrode can be eliminated. By eliminating a tab lead, the laminated armored battery itself can be made lighter and smaller, and also, by reducing the connection space of the laminated armored battery and another device, the device in which a battery is loaded can be made smaller. Further, like a dry battery, an easy battery attachment method in which the laminated armored battery is fitted in a holder can be employed. Further, by not using a tab lead, the producing cost of the battery can be reduced.

Further, the absence or presence of the concave portion of the armoring body of the battery can be selected arbitrarily. Since a storage space for a bare cell can be enlarged by forming a concave portion in an armoring body, an armoring body formed with a concave portion is suited for a medium to high capacity battery using a bare cell with a larger number of laminated layers. On the other hand, a bag shaped armoring body is suited for a low capacity battery.

<Other Embodiments of Laminated Armored Battery>

Figure 4C:
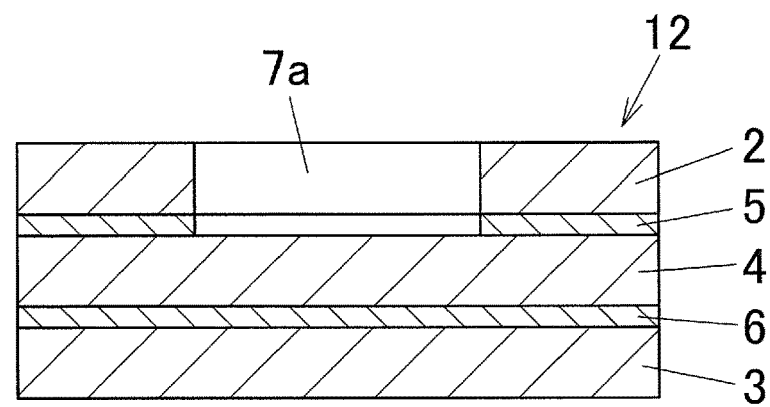
FIG. 4C is a cross-sectional view showing a laminated armoring material having a metal exposed section on one of the surfaces.

The metal exposed section on the outer surface of the armoring body, other than being used as a conductive section, can be used as a soldering section when fixing a battery to a device. Since it is enough for a metal exposed section used exclusively for fixing and not for conduction to be formed only on the outer surface of the armoring body, as shown in FIG. 4C, a laminated armoring material 12 in which a metal exposed section 7a is only formed on the surface on the heat-resistant resin layer 2 side is used.

The electrochemical device of the present invention is not limited to the aforementioned laminated armored battery. A capacitor or a capacitor can be exemplified as other devices.

[Laminated Armoring Material]

FIG. 4A is a cross-sectional view showing the laminated armoring material 1 used as a material for, among members constituting an armoring body 50, 70, and 80 of the laminated armored battery 40, 41, and 42, a main body 51 having a positive electrode conductive section 56 and 83 or a negative electrode conductive section 54 and 84, a cover plate 55, a first sheet 81, and a second sheet 82.

In the laminated armoring material 1, a heat-resistant resin layer 2 as an outer layer is laminated on a first surface of the metal foil layer 4 via a first adhesive agent layer 5, a thermal fusion resin layer 3 as an inner layer is laminated on a second surface of the metal foil layer 4 via a second adhesive agent layer 6, so that resin layers 2 and 3 are laminated on both surfaces of the metal foil layer 4. On both surfaces of the metal foil layer 4, metal exposed sections 7a and 7b in which the metal foil layer 4 is exposed in a plane shape are formed. The first adhesive agent layer 5 and the heat-resistant resin layer 2 are not present at the metal exposed section 7a on the heat-resistant resin layer 2 surface side, and the second adhesive agent layer 6 and the thermal fusion resin layer 3 are not present at the metal exposed section 7b on the thermal fusion resin layer 3 surface side. Further, the metal exposed sections 7a and 7b on both surfaces are formed at the same position sandwiching the metal foil layer 4, and constitute the positive electrode conductive sections 56 and 83 and the negative electrode conductive sections 54 and 84 of the armoring bodies 50, 70, and 80.

[Method of Producing Laminated Armoring Material]

Figure 5:
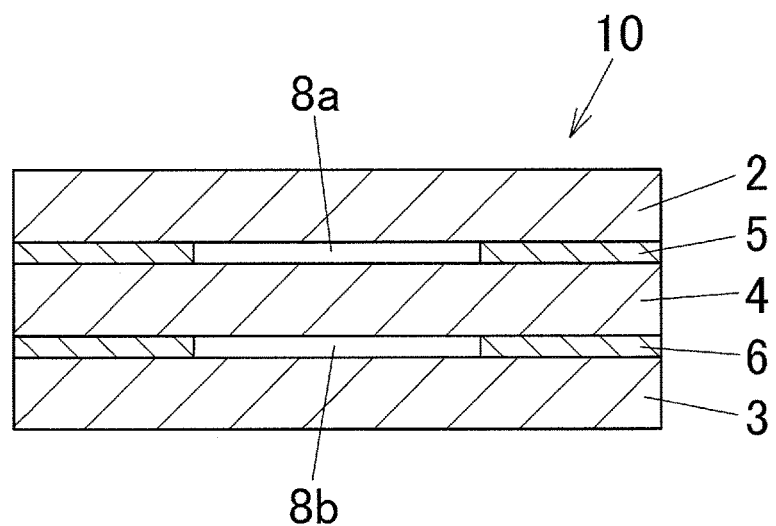
FIG. 5 is a cross-sectional view showing a laminated body for a laminated armoring material.

The laminated armoring material 1 is produced by adhering a heat-resistant resin layer 2 and a thermal fusion resin layer 3 on both surfaces of a metal foil layer 4 and thereafter removing a portion of the heat-resistant resin layer 2 and a portion of the thermal fusion resin layer 3 to expose the metal foil layer 4. In these processes, as a method of adhering the heat-resistant resin layer 2 on the first surface side of the metal foil layer 4 and a method of adhering the thermal fusion resin layer 3 on the second surface side, the adhesive agent unapplied section forming and adhering process prescribed by the present invention is employed to produce a laminated body 10 for a laminated armoring material as shown in FIG. 5, and a resin layer removal process is performed on the laminated body 10 for a laminated armoring material. Hereinafter, each process will be described in detail.

<Adhesion of Metal Foil Layer and Heat-Resistant Resin Layer (Adhesive Agent Unapplied Section Forming and Adhering Process)>

The heat-resistant resin layer 2 is adhered on the first surface of the metal foil layer 4. At this time, an adhesive agent constituting the first adhesive agent layer 5 is applied to a region excluding the portion corresponding to the metal exposed section 7a, and the adhesive agent is not applied to a region corresponding to the metal exposed section 7a. That is, in a state in which the adhesive agent unapplied section 8a in which the adhesive agent is not applied is formed, the metal foil layer 4 and the heat-resistant resin layer 2 are adhered. The adhesive agent can be applied to either joining surface of the metal foil layer 4 and the heat-resistant resin layer 2.

Figure 6:
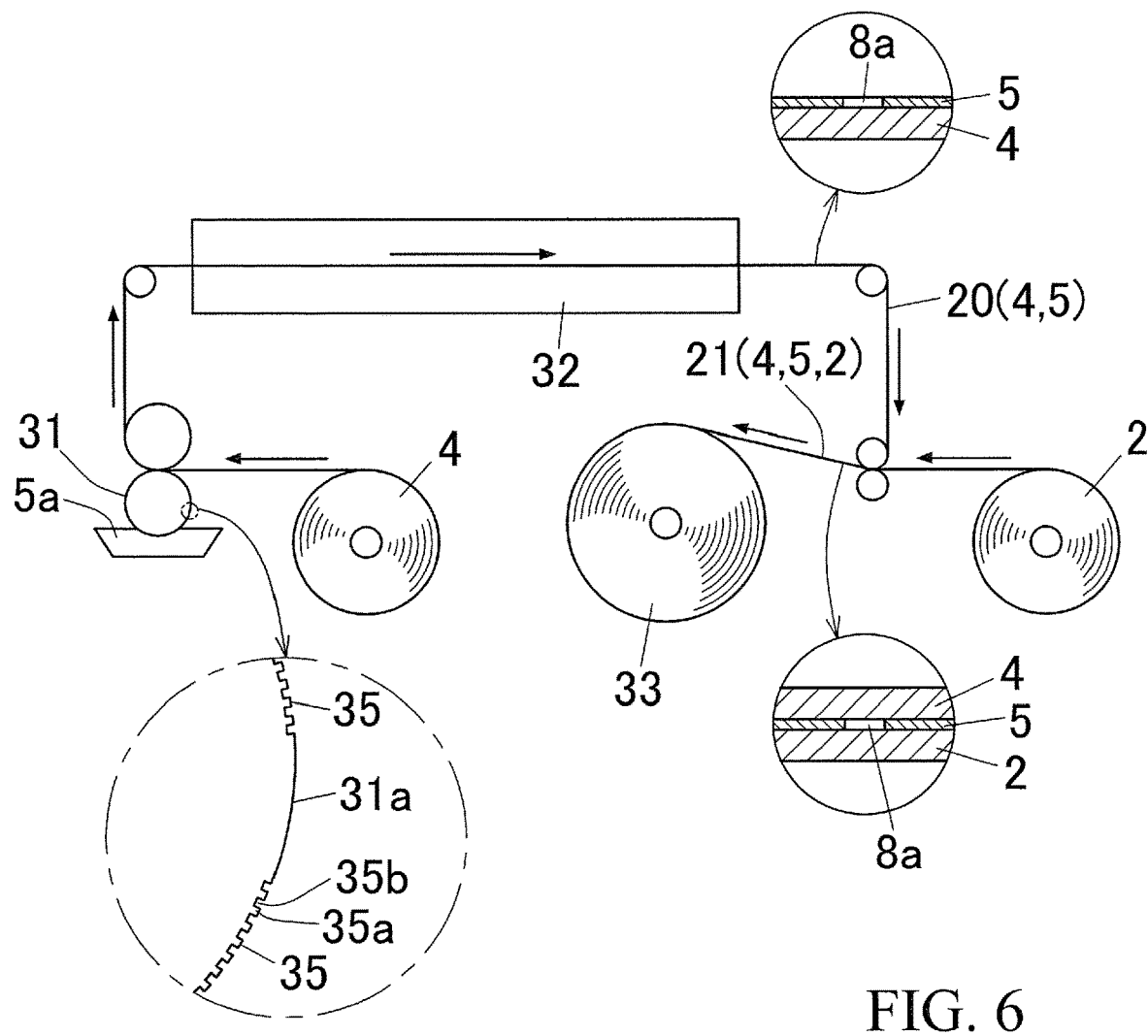
FIG. 6 is a schematic view showing an adhesive agent unapplied section forming and adhering process.

As a method of forming the adhesive agent unapplied section 8a on a portion of the joining surface, in a roll application as shown in FIG. 6, a method of using a roll 31 having concave and convex portions on a peripheral surface can be recommended. The entire outer peripheral surface of the roll 31 is a latticed minute concave and convex region 35 in which minute convex portions 35a and minute concave portions 35b are alternately repeated, and metal exposed section forming convex portions 31a each corresponding to a shape of the metal exposed section 7a are formed in the minute concave and convex region 35. The minute convex portion 35a and the metal exposed section forming convex portion 31a are the same in height and when their top surfaces are considered as a base surface of the roll 31, the minute concave portions 35b are retracted from the base surface. An adhesive agent is applied to the entire outer peripheral surface of the roll 31, and the adhesive agent is scraped off from the top surfaces of the metal exposed section forming convex portions 31a and the top surfaces of the minute convex portions 35a of the minute concave and convex regions 35 using a doctor blade to remain the adhesive agent only in the minute concave portions 35b. By applying the adhesive agent on the application surface of the metal foil layer 4 or the heat-resistant resin layer 2 using the roll 31 to which the adhesive agent is adhered in the aforementioned manner, the adhesive agent adheres to the corresponding portion of the minute concave and convex region 35 in a dot shape or a lattice shape corresponding to the shapes of the minute concave portions 35b. Thus, adhesive agent unapplied sections 8a in which no adhesive agent is applied are formed at the portions corresponding to the metal exposed section forming convex portions 31a. At the corresponding portions of the minute concave and convex regions 35, although the adhesive agent is not adhered to the corresponding portions of the minute convex portions 35a, the adhesive agent adhered to the corresponding portions of the minute concave portions 35b wetly spreads to the corresponding portions of the minute convex portions 35a. Then, when pressure-joining the metal foil layer 4 and the heat-resistant resin layer 2, the adhesive agent spreads further, resulting in a state in which the adhesive agent is evenly applied to the corresponding sections of the minute concave and convex regions 35. In the aforementioned manner, at the joining surface of the metal foil layer 4 and the heat-resistant resin layer 2, the adhesive agent unapplied sections 8a are formed on the corresponding positions of the convex portions 31a of the roll 31 and the first adhesive agent layer 5 is formed on a region excluding the adhesive agent unapplied section 8a.

Further, the application of an adhesive agent in the present invention refers to the act of thinly applying an adhesive agent, and as an application method other than the aforementioned roll coating method, spread application by a spray or a doctor blade can be exemplified.

Further, a case in which the adhesive agent is applied to both the metal foil layer 4 and the heat-resistant resin layer 2 is included in the technical scope of the present invention. In the case of applying the adhesive agent to both layers 4 and 2, it is required that the positions of the adhesive agent unapplied sections match after adhering both the layers.

The adhesion conditions after applying the adhesive agent are arbitrarily set according to the characteristics of the adhesive agent to be used. As shown in FIG. 6, when employing a dry laminating method, after applying an adhesive agent composition 5*a* whose density is adjusted by a solvent to one layer 4, the solvent is made to be evaporated and dried with a drying machine 32 to form a first adhesive agent layer 5 to thereby obtain a two-layer body 20. Afterward, the other layer 2 is stacked, pressure-joined, and adhered to the surface of the first adhesive agent layer 5 of the two-layered body 20 to obtain an intermediate laminated body 21. The intermediate laminated body 21 is hardened under the conditions according to the adhesive agent.

Further, although FIG. 6 exemplifies a process in which an adhesive agent composition 5*a* is applied to the metal foil layer 4 and the heat-resistant resin layer 2 is adhered after drying, a similar operation is performed in a case of applying the adhesive agent composition 5*a* to the heat-resistant resin layer 2.

The application of the adhesive agent composition 5*a* is performed using the roll 31 having convex portions 31*a* to form the adhesive agent unapplied sections 8*a* at positions corresponding to the convex portions 31*a* of the two-layered body 20. Further, in the intermediate laminated body 21, since there exist adhesive agent unapplied sections 8*a* in the joining interface of the metal foil layer 4 and the heat-resistant resin layer 2, the metal foil layer 4 and the heat-resistant resin layer 2 will not be joined even when they come in contact with each other by pressure-joining.

In the aforementioned process, the metal foil layer 4 and the heat-resistant resin layer 2 are adhered together while forming un-adhered sections (adhesive agent unapplied sections).

Further, the method of applying the adhesive agent in the adhesive agent unapplied section forming and adhering process is not limited, and a gravure roll coating method, a reverse roll coating method, a lip roll coating method, etc., can be exemplified. Since adhesive agent unapplied sections 8*a* are formed in the adhesive agent unapplied section forming and adhering process, a gravure roll coating method which is advantageous for forming convex portions on a roll can be recommended.

<Adhesion of Metal Foil Layer and Thermal Fusion Resin Layer (Adhesive Agent Unapplied Section Forming and Adhering Process)>

The thermal fusion resin layer 3 is adhered to the second surface of the metal foil layer 4. Using a similar method for adhering the metal foil layer 4 and the heat-resistant resin layer 2 as described above, an adhesive agent unapplied section 8*b* is formed and both the layers are adhered.

The order of adhering the heat-resistant resin layer 2 and the thermal fusion resin layer 3 to the metal foil layer 4 is not limited. For example, by simultaneously executing the adhesive agent application to the heat-resistant resin layer 2 and the adhesive agent application to the thermal fusion resin layer 3 and successively adhering them to the metal foil layer 4, a laminated body 10 for a laminated armoring material having the structure as shown in FIG. 5 can be produced. Further, as shown in FIG. 6, by winding up the intermediate laminated body 21 in which the metal foil layer 4 and the heat-resistant resin layer 2 are adhered on a wind-up roll 33 and then adhering a thermal fusion resin layer 3 to the intermediate laminated body 21 by a different line, the laminated body 10 for a laminated armoring material having the layer structure as shown in FIG. 5 can be produced.

Further, in a case in which a laminated armoring material 12 having a metal exposed section 7*a* only on one of the surfaces of the metal foil layer 4 as shown in FIG. 4C, the adhesion of the resin layer 2 on the surface side in which the metal exposed section 7*a* is formed is performed by the aforementioned adhesive agent unapplied section forming and adhering process, and the adhesion of the resin layer 3 on the other surface is performed by a known adhesion process in which an adhesive agent is applied to the entire joining surface.

(Resin Layer Removal Process)

Figure 7:
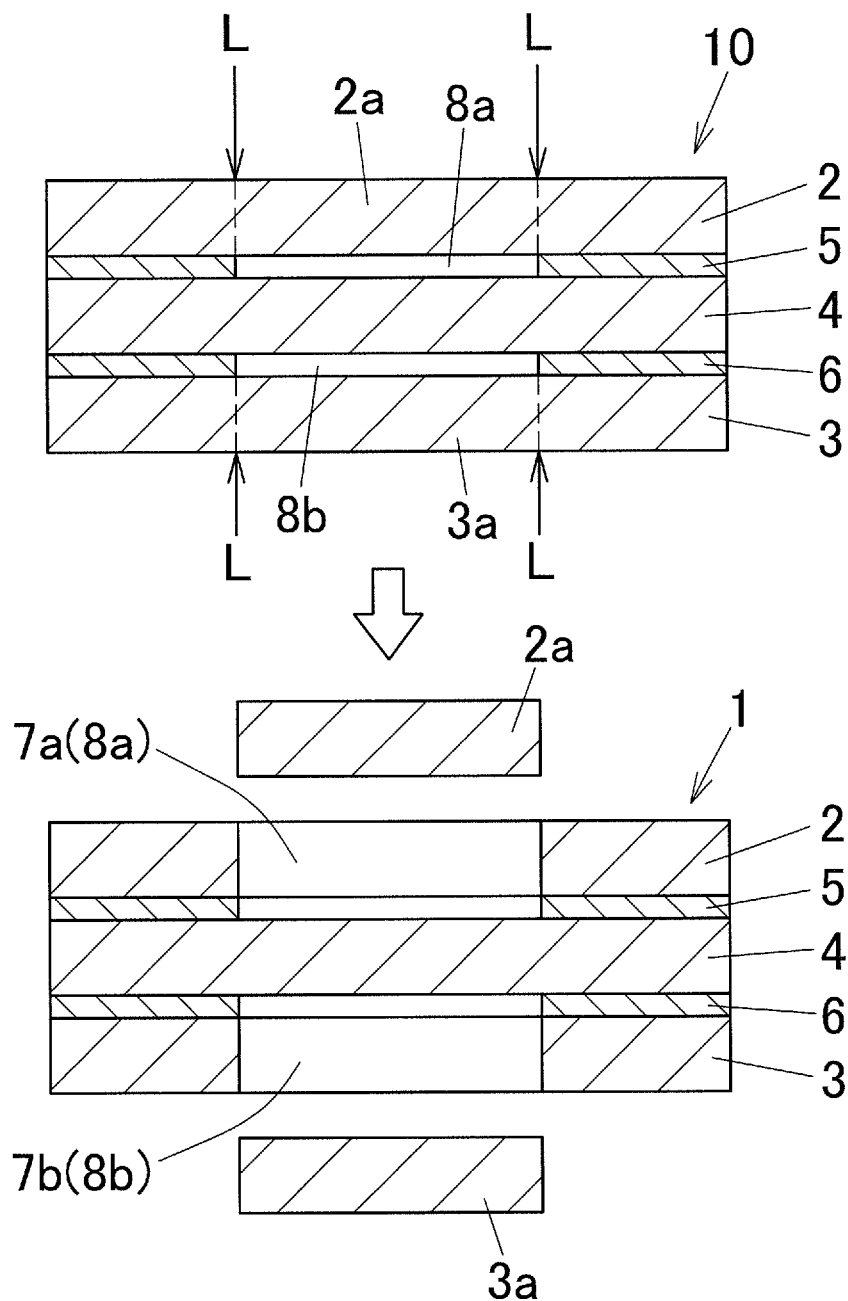
FIG. 7 is a cross-sectional view showing a resin layer removal process.

From the laminated body 10 for a laminated armoring material, the heat-resistant resin layer and the thermal fusion resin layer corresponding to the adhesive agent unapplied sections 8*a* and 8*b* are removed. Although the removal method is not limited, a method of irradiating a laser on the heat-resistant resin layer 2 and the thermal fusion resin layer 3 to cut the heat-resistant resin layer 2 and the thermal fusion resin layer 3 and remove the cut portion can be recommended. In the adhesive agent unapplied section 8*a*, the heat-resistant resin layer 2 and the metal foil layer 4 are not joined and there is no first adhesive agent layer 5. Therefore, as shown in FIG. 7, by irradiating a laser L on the peripheral edge of the adhesive agent unapplied section 8*a* to cut the heat-resistant resin layer 2, the heat-resistant resin layer 2*a* existing at the adhesive agent unapplied section 8*a* can be removed. Similarly, in the adhesive agent unapplied section 8*b*, the thermal fusion resin layer 3 and the metal foil layer 4 are not joined and there is no second adhesive agent layer 6. Therefore, as shown in FIG. 7, by irradiating a laser L on the peripheral edge of the adhesive agent unapplied section 8*b* to cut the thermal fusion resin layer 3, the thermal fusion resin layer 3*a* existing at the adhesive agent unapplied section 8*b* can be removed. An advantage of the laser cutting is that, with an appropriate output, only the targeted layer can be cut and occurrence of burrs can be controlled. Also, by removing the heat-resistant resin layer 2*a* and the thermal fusion resin layer 3*a*, the metal foil layer 4 is exposed, forming the metal exposed sections 7*a* and 7*b*. As a result, a laminated armoring material 1 having the structure as shown in FIG. 4A is formed.

In the adhesive agent unapplied sections 8*a* and 8*b*, since the heat-resistant resin layer 2 and the thermal fusion resin layer 3 are not joined to the metal foil layer 4, it is easy to partially cut the heat-resistant resin layer 2 and the thermal fusion resin layer 3, thereby making it possible to form planar metal exposed sections 7*a* and 7*b* with an easy operation of cutting the heat-resistant resin layer 2 and the thermal fusion resin layer 3 at the peripheral edges of the adhesive agent unapplied sections 8*a* and 8*b*. At the stage of adhering the metal foil layer 4 and the heat-resistant resin layer 2 or the thermal fusion resin layer 3, since an adhesive agent is not applied to the portions forming the metal exposed sections 7*a* and 7*b*, and an adhesive agent is not adhered to the adhesive agent unapplied sections 8*a* and 8*b*, nothing remains on the surface of the metal foil layer 4 after removing the heat-resistant resin layer 2 and the thermal fusion resin layer 3, allowing an assured exposure of the metal foil layer 4.

The type of the laser is not limited, and either of a solid-state laser represented by a YAG laser and a gas laser represented by a carbon dioxide laser may be used.

In a case of using a laminated armoring material in which a metal foil layer and a resin layer is laminated as an armoring body material, a flat sheet obtained by a laminating process is processed or cut into desired dimensions. Further, an armoring body material obtained by such processes is connected to a bare cell and the armoring body is heat-sealed. The aforementioned resin layer removal process can be performed at any time after obtaining the laminated body 10 for a laminated armoring material by adhering the heat-resistant resin layer 2 and the thermal fusion resin layer 3 to the metal foil layer 4 as long as there is no disadvantage for a work such as a forming work. Further, the removal of the heat-resistant resin layer 2a and the removal of the thermal fusion resin layer 3a can be performed at different times.

For example, when producing a main body 51 of an armoring body 50 of the first laminated armored battery 40, a concave portion 52 is formed on a flat sheet and thereafter a bare cell 60 is connected. Since the removal of the thermal fusion resin layer 3a which is on the inner side of the armoring body 50 must be performed before connecting the bare cell 60, the resin layer removal process is performed on the flat sheet-like laminated body 10 for a laminated armoring material before the formation of the concave portion 52, or after the formation of the concave portion 52 and before the bare cell 60 connection. When performing on a flat sheet-like laminated body 10 for a laminated armoring material, it can be performed on a long material before being cut into an arbitrary dimension for forming or a material piece after being cut. On the other hand, since the removal of the heat-resistant resin layer 2a on the outer side of the armoring body 50 is unrelated to the connection of the bare cell 60, it can be performed at any time, e.g., before forming the concave portion 52, after forming the concave portion 52, after connecting the bare cell 60, or after heat-sealing the main body 51 and the cover plate 55.

Further, since the cover plate 55 of the armoring body 50 is a flat sheet and a concave portion is not formed, the removal of the thermal fusion resin layer 3a which is an inner layer is performed either on a long material before cutting into desired dimensions or after cutting but before connecting with the bare cell 60. Since the removal of the heat-resistant resin layer 2a on the outer side is unrelated to the connection of the bare cell 60, in the same manner as in the removal of the heat-resistant resin layer 2a of the main body 51, it can be performed at any time on a long material before cutting into desired dimensions, after cutting, after connecting to the bare cell 60, or after heat-sealing the main body 51 and the cover plate 55.

In the bag-shaped armoring body 80 of the third laminated armored battery 42, since a concave portion is not formed, in the same manner as the aforementioned cover plate 55, the removal of the thermal fusion resin layer 3a as the inner layer is performed either on a long material before being cut into desired dimensions or at a time after cutting but before connecting to the bare cell 65. Since the removal of the heat-resistant resin layer 2a on the outer side is unrelated to the connection of the bare cell 65, it can be performed at any time on a long material before being cut into desired dimensions, after cutting, after connecting the bare cell 65, or after heat-sealing the two sheets 81 and 82.

As described above, the method of producing the laminated armoring material of the present invention includes not only a case in which it is completed in a flat-sheet state, but also a case in which the processes of a plastic deformation, cutting, connection of the bare cell, and heat-sealing are inserted before the resin layer removal process.

Also, it is preferable that the metal exposed sections 7a and 7b on both surfaces of the metal foil layer 4 are formed at the same position sandwiching the metal foil layer 4. The metal exposed section 7b on the inner side of the armoring body is a joining member of the electrode of the bare cell, and when performing ultrasonic joining, ultrasonic vibrations are applied to the metal exposed section 7b from the outer side of the armoring body via the metal foil layer 4. At this time, when the metal exposed sections 7a and 7b on the inner and outer sides are positioned at the same position sandwiching the metal foil layer 4, ultrasonic vibration can be applied from the metal exposed section 7a on the outside, and the vibration is directly transmitted to the metal exposed section 7b on the inside, so the joining efficiency is excellent. However, if the positions of the metal exposed sections 7a and 7b on the inside and the outside are displaced, the ultrasonic vibration is transmitted via three layers, i.e., the heat-resistant resin layer 2, the first adhesive agent layer 5, and the metal foil layer 4, so the joining efficiency deteriorates due to attenuation of the ultrasonic vibration, etc. Therefore, it is preferable that the metal exposed sections 7a and 7b on the inside and the outside are formed at the same position sandwiching the metal foil layer 4.

The position of the conductive section (metal exposed section) in the armoring body is not limited, but it is preferable to avoid a position where processing of the armoring body is obstructed or a position where the strength decreases due to processing. For example, as shown in the main body 51 shown in FIG. 1A, in cases where side walls 52a are formed upward from a flat sheet by bulging or drawing to form a concave portion 52, it is preferable to avoid forming a metal exposed section on the side walls 52a and the corner sections 52b having a large amount of deformation. In the main body 51, it is preferable to form the metal exposed section on the bottom wall 52c of the concave portion 52.

(Other Methods of Producing Laminated Armoring Material Having Metal Exposed Section)

Further, the laminated armoring material used as an armoring material of an electrochemical device of the present invention is not limited to a material in which a metal exposed section is formed by the aforementioned method. Further, the metal exposed section on the heat-resistant resin layer side and the metal exposed section on the thermal fusion resin layer side are not limited to be formed with the same method.

As other methods of forming a metal exposed section, a method having the following processes can be exemplified.

(1) A masking tape is adhered to a necessary part of the metal foil layer. The adhesive agent of the masking tape has a weaker adhesiveness than the adhesive agent used for adhering the metal foil layer and the resin layer in the following process (2).

(2) An adhesive agent is applied to the entire surface of the metal foil layer, the entire surface of the resin layer, or the entire surfaces of the metal foil layer and the resin layer in which the masking tape was adhered.

(3) The metal foil layer and the resin layer are adhered together, and arbitrarily cured. The masking tape is adhered more strongly to the resin layer than the metal foil layer.

(4) The peripheral edge of the masking tape adherence section of the resin layer is cut to remove the resin layer. Since the adhesiveness of the masking tape to the metal foil layer is weaker, the resin layer is removed along with the masking tape. At the portion where the masking tape has been removed, the metal foil layer is exposed, and this section becomes the metal exposed section. The cutting of the resin layer can be performed by, e.g., a cutter knife or laser irradiation.

In a case in which a metal exposed section is formed on the other surface of the metal foil layer, the aforementioned process is performed on the other surface as well.

[Constituent Material of Laminated Armoring Material]

For the materials for each layer constituting the laminated armoring material 1, any materials can be used as long as they can be used as armoring materials for an electrochemical device. The preferred materials are as follows.

(Heat-Resistant Resin Layer)

As a heat-resistant resin constituting the heat-resistant resin as an outer layer, a heat-resistant resin which does not melt at a heat-sealing temperature at the time of heat-sealing the armoring member. As the heat-resistant resin, it is preferable to use a heat-resistant resin having a melting point higher than the melting point of the thermal fusion resin constituting the thermal fusion resin layer 3 by 10° C. or more. It is especially preferable to use a heat-resistant resin having a melting point higher than the melting point of the thermal fusion resin by 20° C. or more. As the heat-resistant resin layer 2, for example, a polyamide film, a polyester film, etc., can be exemplified, and these stretched films are preferably used. Among them, from the viewpoint of formability and strength, a biaxially stretched polyamide film or a biaxially stretched polyester film, or a multi-layer film including the biaxially stretched polyamide film or the biaxially stretched polyester film is especially preferable. Further, it is preferable to use a multi-layer film in which a biaxially stretched polyamide film and a biaxially stretched polyester film are adhered together. The polyamide film is not especially limited, but, for example, a nylon 6 film, a nylon 6, 6 film, an MXD nylon film, etc., can be exemplified. Further, as a biaxially stretched polyester film, a biaxially stretched polybutylene terephthalate (PBT) film, a biaxially stretched polyethylene terephthalate (PET) film, etc., can be exemplified.

Further, it is also preferable to add a lubricant and/or solid fine particles to improve the slidability of the surface of the heat-resistant resin layer 2 to thereby improve the slidability with respect to a molding die.

It is preferable that the thickness of the heat-resistant resin layer 2 is 9 μm to 50 μm. By setting it to the suitable lower limit or more, sufficient strength can be secured as a packaging material. By setting it to the suitable upper limit or less, the stress at the time of molding can be made small, which in turn can improve the moldability.

(Thermal Fusion Resin Layer)

The thermal fusion resin layer 3 which is an inner layer has excellent chemical resistance against strongly corrosive electrolyte used for lithium ion secondary batteries, etc., and exerts a role of giving heat-sealing properties to a packaging material.

As the thermal fusion resin layer 3, it is preferable to use a thermoplastic resin unstretched film. The thermoplastic resin unstretched film is not specifically limited, but in terms of chemical resistance and heat-sealing properties, it is preferably constituted by polyethylene, polypropylene, olefin-series copolymer, and their acid modifications and ionomers. Further, as an olefin-series copolymer, EVA (ethylene-vinyl acetate copolymer), EAA (ethylene-acrylic acid copolymer), and EMMA (ethylene-methacrylic acid copolymer) can be exemplified. Further, a polyamide film (e.g., nylon 12) or a polyimide film can also be used.

As to the thermal fusion resin layer 3, similarly to the heat-resistant resin layer 2, it is preferable to blend a lubricant and/or solid fine particles to improve the slidability of the surface of the heat-resistant resin layer.

It is preferable that the thickness of the thermal fusion resin layer 3 is set to 20 μm to 80 μm. By setting the thickness to 20 μm or more, generation of pinholes can be sufficiently prevented, and by setting the thickness to 80 μm or less, the amount of resin used can be reduced, thereby making it possible to attain the cost reduction. Among them, it is especially preferable that the thickness of the thermal fusion resin layer 3 is set to 20 μm to 50 μm. Further, the thermal fusion resin layer 3 can be a single layer or a multi-layer. As a multi-layer film, a three-layer film in which a random polypropylene film is laminated on each of both surfaces of a block polypropylene film can be exemplified.

(Metal Foil Layer)

The metal foil layer 4 plays a role of giving gas barrier characteristics for preventing invasion of oxygen and/or moisture into the laminated armoring material 1. In a case in which the metal exposed section is used as a conductive section, a metal foil layer having good conductivity is used. For example, an aluminum foil, a copper foil, a nickel foil, a stainless foil, a clad foil thereof, an annealed foil thereof, an un-annealed foil thereof, etc., can be exemplified. Further, as to an aluminum foil, in the case of forming a concave portion 52 by bulging or drawing (see FIG. 2A), it is preferable to use an aluminum alloy foil: JIS A8079 or JIS A8021 having good formability. Further, in a case in which formability does not need to be considered, other than the aforementioned aluminum alloy foil, pure aluminum series aluminum foils can also be suitably used.

Further, it is also preferable to use a metal foil plated with a conductive metal such as nickel, tin, copper, chrome, etc., such as a plated aluminum foil. The conductive plated film may be formed at a portion corresponding to at least the metal exposed section of the metal foil layer. Further, it is preferable that the metal foil layer 4 is subjected to the following chemical conversion treatment as a substrate treatment to form a chemical conversion film.

(Chemical Conversion Film of Metal Foil Layer)

The outer layer and the inner layer of the laminated armoring material 1 are layers made of resin. For these resin layers, although a minute amount, light, oxygen, and/or liquid may enter from outside the case and the contents (electrolyte of batteries, food products, pharmaceutical products, etc.) may soak from the inside. When reaching the metal foil layer, these intruded objects cause corrosion of the metal foil layer. In the laminated armoring material 1 of the present invention, by forming a chemical conversion film high in corrosion resistance on the surface of the metal foil layer 4, the corrosion resistance of the metal foil layer 4 can be improved.

The chemical conversion film is a film formed by subjecting the metal foil surface to a chemical conversion treatment, and can be formed, for example, by subjecting the metal foil to a chromate treatment or a non-chromium type chemical conversion treatment using a zirconium compound. For example, in the case of a chromate treatment, after applying a solution of any one of the following mixtures 1) to 3) to the surface of the metal foil to which a degreasing treatment was subjected, it is dried.

1) A mixture of phosphoric acid, chromic acid and at least one of metal salt of fluoride and non-metal salt of fluoride 2) A mixture of phosphoric acid, acrylic resin, any one of acrylic resin, chitosan derivative resin, and phenol series resin, at least one of chromic acid and chromium (III) salt 3) A mixture of phosphoric acid, any one of acrylic resin, chitosan derivative resin, and phenol series resin, at least one of chromic acid and chromium (III) salt, and at least one of metal salt of fluoride and non-metal salt of fluoride For the chemical conversion film, it is preferable that the chromium adhesion amount is 0.1 to 50 mg/m$^2$, more preferably 2 to 20 mg/m$^2$. By the chemical conversion film having the thickness or the chromium adhesion amount, a molding packaging material having high resistance to corrosion can be obtained.

Further, a laminated armoring material having the chemical conversion film on one of surfaces is included in the present invention.

The thickness of the metal foil layer 4 is preferably 20 μm to 200 μm. By setting the thickness to 20 μm or more, generation of pinholes or breakages at the time of rolling and heat-sealing when producing a metal foil can be prevented. By setting the thickness to 200 μm or less, the stress at the time of bulging or drawing can be decreased to thereby improve the formability. Further, by setting the thickness of the metal foil layer 4 to 200 μm or less, the increase in weight and cost of materials can be controlled.

(First Adhesive Agent Layer)

The first adhesive agent layer 5 is a layer for joining the metal foil layer 4 and the heat-resistant resin layer 2 as an outer layer. For example, an adhesive agent including a two-part curing type polyester-urethane-based resin including a polyester resin as a base resin and a multifunctional isocyanate compound as a curing agent, or a polyether-urethane-based resin is preferably used.

(Second Adhesive Agent Layer)

The second adhesive agent layer 6 is a layer for joining the metal foil layer 4 and the thermal fusion resin layer 3 as an inner layer. For example, a polyurethane-based adhesive agent, an acrylic-based adhesive agent, an epoxy-based adhesive agent, a polyolefin-based adhesive agent, an elastomer-based adhesive agent, a fluorine-based adhesive agent, etc., can be exemplified. Among them, it is preferable to use an acrylic-based adhesive agent or a polyolefin-based adhesive agent, and in such a case, the resistance to electrolyte and moisture barrier characteristics of the packaging material 1 can be improved. Further, in the case of using the laminated armoring material as a battery case, it is preferable to use an adhesive agent such as an acid-modified polypropylene, polyethylene, etc.

For the adhesive agent unapplied section, since the glossiness is different from the section in which an adhesive agent is applied even through the heat-resistant resin layer or the thermal fusion resin layer, even in a state in which the heat-resistant resin layer or the thermal fusion resin layer is adhered, the position and the shape of the adhesive agent unapplied section can be discriminated.

Further, in the first adhesive agent layer and the second adhesive agent layer, to make it easy to discriminate the adhesive agent unapplied section, a coloring agent such as an organic pigment, an inorganic pigment, a pigment, etc., can be added to the adhesive agent in a range of 0.1 mass parts to 5 mass parts with respect to 100 mass parts of a resin component. The organic pigment is not especially limited, but for example, an azo pigment such as lake red, naphthols, Hansa yellow, Disazo yellow, benzimidazolone, etc.; a polycyclic pigment such as quinophthalone, isoindolin, pyrrolopyrrole, dioxazine, phthalocyanine blue, phthalocyanine green, etc.; a lake pigment such as lake red C, Watchung red, etc., can be exemplified. Further, the inorganic pigment is not especially limited, but for example, carbon black, titanium oxide, calcium carbonate, kaolin, iron oxide, zinc oxide, etc., can be exemplified. Further, the pigment is not especially limited, but for example, a yellow pigment such as a trisodium salt (Yellow No. 4), a red pigment such as a disodium salt (Red No. 3), a blue pigment such as a disodium salt (Blue No. 1) can be exemplified.

Further, regardless of whether a coloring agent is added, by adhering a transparent heat-resistant resin layer or a thermal fusion resin layer, it becomes easy to discriminate the adhesive agent unapplied section. When a coloring agent is added to the adhesive agent, and a transparent heat-resistant resin layer or a thermal fusion resin layer is adhered, it becomes extremely easy to discriminate the adhesive agent unapplied section.

Further, the total thickness of the laminated armoring material is preferably in the range of 50 to 300 μm. When the total thickness is less than 50 μm, it is becomes more likely to occur breakage or generation of pinholes at the time of forming and heat-sealing. Further, when the total thickness exceeds 300 μm, there is a risk that the formability deteriorates. When the laminated armoring material becomes thicker, the cost of the materials increases and the weigh increases as well.

EXAMPLES

A laminated armoring material 1 having the metal exposed sections 7a and 7b as shown in FIG. 4A and a laminated armoring material 11 which does not have a metal exposed section as shown in FIG. 4B were produced. Three types of laminated armored batteries in which these laminated armoring materials 1 and 11 were used as the armoring material for the laminated armored batteries were produced.

Figure 8:
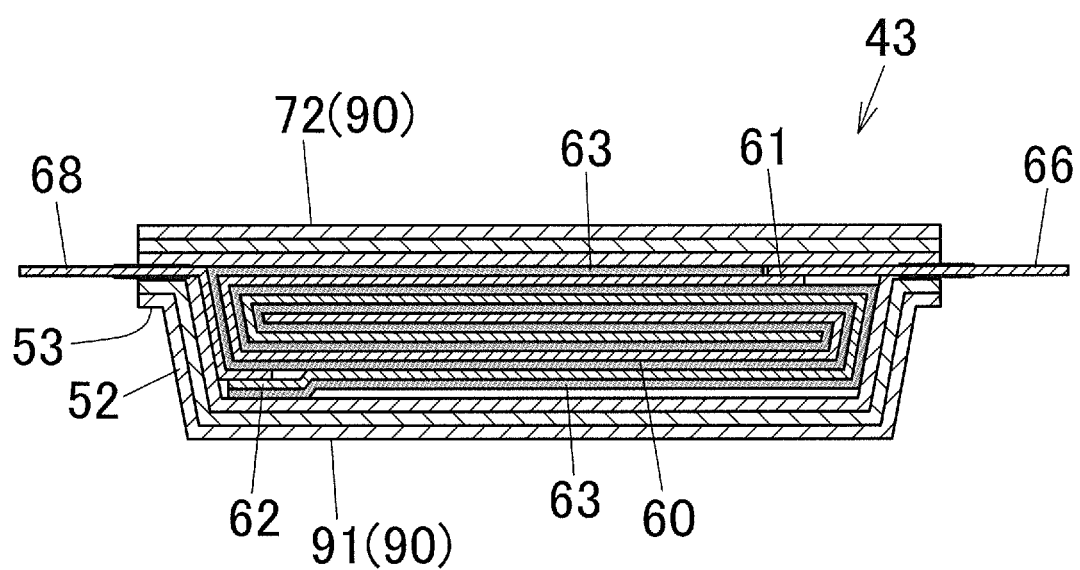
FIG. 8 is a cross-sectional view showing a laminated armored battery of Comparative Example 1.

The laminated armored battery 40 of Example 1 is shown in FIG. 1A and FIG. 1B, and a positive electrode conductive section 56 and a negative electrode conductive section 54 are formed on the armoring body 50. The laminated armored battery 41 of Example 2 is shown in FIG. 2A and FIG. 2B, and a negative electrode conductive section 54 is formed on the armoring body 70, and a positive electrode tab lead 66 is pulled outside the armoring body 70. The laminated armored battery 43 of Comparative Example 1 is shown in FIG. 8, and a positive electrode tab lead 66 and a negative electrode tab lead 68 are pulled outside an armoring body 90.

[Production of Laminated Armoring Material]

The material of each layer constituting the two types of laminated armoring materials 1 and 11 are the same and as follows.

Metal foil layer 4: a soft aluminum foil (JIS H4160 A8079H) having a thickness of 40 μm in which both surfaces thereof were subjected to a chemical conversion treatment was used. The chemical conversion treatment was performed by immersing the soft aluminum foil in a 25° C. solution of a mixture of a compound of polyacrylic acid, phosphoric acid, chromium, and fluorine for 5 seconds and then pulling out to dry for 30 seconds in a thermostatic chamber at 150° C. In this chemical conversion treatment, the chromium adhesion amount on the surface of the soft aluminum foil was 3 mg/m$^2$ on each surface.

Heat-resistant resin layer 2: a biaxially stretched polyamide film having a thickness of 25 μm Thermal fusion resin layer 3: an unstretched polypropylene film having a thickness of 40 μm First adhesive agent layer 5: two-part curing type polyester-urethane-based adhesive agent Second adhesive agent layer 6: two-part curing type acid-modified polypropylene-based adhesive agent <<Laminated Armoring Material Having Metal Exposed Section>>
<Adhering Metal Foil Layer and Heat-Resistant Resin Layer (Adhesive Agent Unapplied Section Forming and Adhering Process)>

The heat-resistant resin layer 2 and the metal foil layer 4 were adhered together using the dry laminating method shown in FIG. 6. As an adhesive agent application roll, a gravure roll 31 having convex portions 31a having a top surface measurement of 10 mm×10 mm was used. The top surface measurement of the convex portions 31a corresponded to the measurement of the metal exposed sections 7a and 7b.

On one of the surfaces of the metal foil layer 4, an adhesive agent composition 5a whose concentration was adjusted with a solvent was applied using the gravure roll 31 and dried at 100° C. to thereby form the first adhesive agent layer 5 having adhesive agent unapplied sections 8a corresponding to the convex portion 31a shape. Subsequently, the heat-resistant resin layer 2 was stacked on the first adhesive agent layer 5 side surface and pressure-joined to obtain an intermediate laminated body 21. Further, the intermediate laminated body 21 was cured for 3 (three) days at 40° C. in an aging furnace to cure the first adhesive agent layer 5. The thickness of the first adhesive agent layer 5 after curing was 3 μm.

<Adhering Metal Foil Layer and Thermal Fusion Resin Layer (Adhesive Agent Unapplied Section Forming and Adhering Process)>

On the other surface of the metal foil layer 4 of the intermediate laminated body 21 after curing, the second adhesive agent layer 6 having an adhesive agent unapplied section 8b was formed by the same method for adhering the aforementioned heat-resistant resin layer 2. The adhesive agent unapplied section 8b was formed at the same position as the adhesive agent unapplied section 8a on the heat-resistant resin layer 2 side sandwiching the metal foil layer 4. Subsequently, the thermal fusion resin layer 3 was stacked on the second adhesive agent layer 6 side surface and pressure-joined to obtain a laminated body 10 for a laminated armoring material as shown in FIG. 5. Further, the laminated body 10 for a laminated armoring material was cured for 3 (three) days at 40° C. in an aging furnace to cure the second adhesive agent layer 6. The thickness of the second adhesive agent layer 6 after curing was 2 μm.

By the aforementioned two processes, the laminated body 10 for a laminated armoring material as shown in FIG. 5 was obtained.

<Resin Layer Removal Process>

As shown in FIG. 7, on the laminated body for a laminated armoring material 10, YAG laser L was irradiated along the peripheral edge of the adhesive agent unapplied section 8a of the heat-resistant resin layer 2 to cut the heat-resistant resin layer 2 to thereby remove the heat-resistant resin layer 2a corresponding to the adhesive agent unapplied section 8a. Further, with a similar method, YAG laser L was irradiated along the peripheral edge of the adhesive agent unapplied section 8b of the thermal fusion resin layer 3 to cut the heat-resistant resin layer 3 to thereby remove the thermal fusion resin layer 3a corresponding to the adhesive agent unapplied section 8b. With these processes, the metal foil layer 4 was exposed, and a laminated armoring material 1 having metal exposed sections 7a and 7b of 10 mm×10 mm on both surfaces was obtained.

<Laminated armoring material Not Having Metal Exposed Section>

A laminated armoring material 11 as shown in FIG. 4B was produced by a dry laminating method in the same manner as in the production of the laminate armoring material having the aforementioned metal exposed section except that a gravure roll in which no convex portion 31a is formed and the entirety is constituted by a fine concave and convex region 35 was used as a roll for applying an adhesive agent. The material and the layer thickness of each layer 2, 3, 4, 5, and 6 are the same as those of the laminated armoring material 1 having the metal exposed sections 7a and 7b, and only differs in terms of the presence or absence of the metal exposed sections.

[Process into Armoring Body]

The laminated armored batteries 40, 41, and 43 of Examples 1 and 2, and Comparative Example 1 were the same in that the constituent materials of the armoring body 50, 70 and 90 are a combination of a main body 51 and 91 having a concave portion 52 and a flat cover plate 55 and 72, and were different with regards to the presence or the absence of an electric terminal in the constituent materials.

The main bodies 51 of Example 1 and Example 2 were the same. A flat sheet laminated armoring material 1 was roughly cut so that the metal exposed sections 7a and 7b were positioned at the center, and a concave portion 52 was formed by bulging. In the bulging, using a straight mold including a polytetrafluoroethylene punch having a length 100 mm×a width 100 mm and a corner-R: 2 mm and a die having a length 100.5 mm×a width 100.5 mm and a corner-R: 2.25 mm and having a free forming height, bulging one step process forming was performed in a manner such that the inner thermal fusion resin layer 3 was in contact with the punch, to form a concave portion 52 having a side wall 52a 4 mm in height (formed depth). In this forming process, the laminated armoring material 1 was positioned so that the center of the punch matched the center of the metal exposed sections 7a and 7b, and the metal exposed sections 7a and 7b were formed at the center of the bottom wall 52c of the concave portion 52. The laminated armoring material 1 after the bulging process was punched to be 110 mm×110 mm, leaving a flange 53 having a width of 5 mm at the opening edge of the concave portion 52. The metal exposed sections 7a and 7b are negative electrode conductive sections 54 in the armoring body 50 and 70.

The main body 91 of Comparative Example 1 was produced in the same manner as in Examples 1 and 2, by subjecting a flat sheet laminated armoring material 11 which does not have a metal exposed section to bulging to form a concave portion 52 and punching after forming.

The cover plate 55 of Embodiment 1 was produced by punching a flat sheet laminated armoring material 1 having metal exposed sections 7a and 7b to be 110 mm×110 mm in a manner in which the metal exposed sections 7a and 7b were positioned at the center. The metal exposed sections 7a and 7b are positive electrode conductive sections 56 in the armoring body 50 and 70.

The cover plate 72 of Embodiment 2 and the cover plate 72 of Comparative Example 1 were produced by punching a flat sheet laminated armoring material 11 which does not have a metal exposed section to be 110 mm×110 mm.

On Table 1 shown below, the reference figures, and the presence or absence of electrode terminals in the armoring bodies 50, 70, and 90 of each example are shown.

[Assembling Laminated Armored Battery]

The bare cell 60 was the same in each example, and was produced using a positive electrode 61 made of a hard aluminum foil having a thickness of 30 μm, a negative electrode 62 made of a copper foil having a thickness of 30

μm, and a separator 63 made of a polypropylene film having a thickness of 30 μm. After the three types of materials were wound 12 times to a paper cylinder having an inner diameter of 50 mm and a thickness of 8 mm in a state in which 5 layers were laminated in order of the separator 63/the positive electrode 61/the separator 63/the negative electrode 62/the separator 63, to form a layered object, the paper cylinder was pulled out, and the layered object was pressed and crushed into a flat object. In the flat object, the separator 63 was arbitrarily cut so that the end portion of the positive electrode 61 was exposed on the upper side and the end portion of the negative electrode 62 was exposed on the lower side, to make it into a bare cell 60. Further, the bare cell 60 of FIG. 1A, FIG. 2A, and FIG. 8 are shown with a reduced number of winding.

The positive electrode tab lead 66 of Example 2 and Comparative Example 1 and the negative electrode tab lead 68 of Comparative Example 1 were produced by arranging an polypropylene film modified with maleic anhydride (melting point of 168° C., Mitsubishi Chemical Corporation MODIC (Registered Trademark) P502) (67b) having a width 15 mm×a length 100 mm×a thickness 0.1 mm on top and bottom of the center section of the aluminum plate 67a having a width 15 mm×a length 15 mm×a thickness 0.1 mm, then sandwiching for 4 seconds with a flat hot plate in which the top and the bottom were heated to 200° C. to heat and heat-seal.

The electrolytic liquid was adjusted by mixing ethylene carbonate, dimethylene carbonate, and dimethylcarbonate at a volume ratio of 1:1:1 and adding 1 mol of $LiPF_6$ for 1 L of the mixed liquid.

The laminated armored battery 40 of Example 1 was assembled and produced by the following process.

First, an end portion of the negative electrode 62 of the bare cell 60 was joined to the negative electrode conductive section 54 of the main body 51 by ultrasonic joining, and an end portion of the positive electrode 61 of the bare cell 60 was joined to the positive electrode conductive section 56 of the cover plate 55 by ultrasonic joining. Then, the bare cell 60 was accommodated in the concave portion 52 of the main body 51 and covered by the cover plate 55. Next, three sides among the four sides of contact sections of the flange 53 and the cover plate 55 of the main body 51 were heated by sandwiching with a flat heated plate heated to 200° C. for 2 seconds to heat-seal the thermal fusion resin layers 3. One non-heat-sealed side was used as an electrolytic liquid injection opening, and through the electrolytic liquid injection opening, 10 mL of the electrolytic liquid was injected into the armoring body 50. After injecting the electrolytic liquid, the remaining one side (electrolytic liquid injection opening) was sandwiched for 2 seconds with flat heated plates heated to 200° C. to be heated under a decompression of 86 kPa, to thereby heat-seal the thermal fusion resin layers 3.

The laminated armored battery 41 of Example 2 was assembled and produced by the following process.

First, an end portion of the negative electrode 62 of the bare cell 60 was joined to the negative electrode conductive section 54 of the main body 51 by ultrasonic joining. On the other hand, an end portion of the positive electrode tab lead 66 was joined to an end portion of the positive electrode 61 by ultrasonic joining. Then, the bare cell 60 was accommodated in the concave portion 52 of the main body 51 and covered by the cover plate 72 in a state in which the other end side of the positive electrode tab lead 66 was pulled out of the armoring body 70. Next, three sides among the four sides of contact sections of the flange 53 and the cover plate 72 of the main body 51, including a side in which the positive electrode tab lead 66 was pulled out, were heated by sandwiching with a flat heated plate heated to 200° C. for 2 seconds, to heat-seal the thermal fusion resin layers 3. Next, by using the same method as Example 1, the electrolytic liquid was injected into the armoring body 70, and the remaining one side was heat-sealed.

The laminated armored battery 43 of Comparative Example 1 was assembled and produced by the following process.

First, one end portion of the positive electrode tab lead 66 was joined to an end portion of the positive electrode 61 of the bare cell 60 by ultrasonic joining, and one end portion of the negative electrode tab lead 68 was joined to an end portion of the negative electrode 62 by ultrasonic joining. Next, the bare cell 60 was accommodated in the concave portion 52 of the main body 91 and the other end side of the positive electrode tab lead 66 and the other end side of the negative electrode tab lead 68 were pulled outside from the opening edge of two opposing sides of the concave portion 52. At this time, the negative electrode tab lead 68 joined to the negative electrode 62 at the bottom side of the bare cell 60 was bent and pulled outside from the opening edge of the concave portion 52. Then, it was covered by the cover plate 72 in a state in which the positive electrode tab lead 66 and the negative electrode tab lead 68 were pulled outside of the armoring body 90. Next, three sides among the four sides of contact sections of the flange 53 and the cover plate 72 of the main body 91, including two sides in which the positive electrode tab lead 66 and the negative electrode tab lead 68 were pulled out, were heated by sandwiching with a flat heated plate heated to 200° C. for 2 seconds, to heat-seal the thermal fusion resin layers 3. Next, by using the same method as Example 1, the electrolytic liquid was injected, and the remaining one side was heat-sealed.

[Evaluation of Laminated Armored Batteries]

(Rate of Weight Reduction)

The weights of the three types of the produced laminated armored batteries 40, 41, and 43 were measured using an electronic balance (UX820H made by Shimadzu Corporation), and the rate of weight reduction of the laminated armored batteries 40 and 41 of Examples 1 and 2 were calculated with the following equation. In the following equation, A is the weight of the laminated armored battery 40 and 41 of Example 1 or Example 2, and B is the weight of the laminated armored battery 43 of Comparative Example 1.

$$\text{Rate of Weight Reduction (\%)} = \{(B-A)/B\} \times 100$$

(Insulation Resistance)

For the laminated armored batteries 40, 41, and 43 of each example, the insulation resistance between the positive electrode and negative electrode exposed to the outside was measured. The specific measurement position was between the positive electrode conductive section 56 and the negative electrode conductive section 54 of the armoring body 50 for Example 1, between the positive electrode tab lead 66 pulled out from the armoring body 70 and the negative electrode conductive section 54 of the armoring body 70 for Example 2, and between the positive electrode tab lead 66 pulled out from the armoring body 90 and the negative electrode tab lead 68 for Comparative Example 1. The measurement of the insulation resistance was performed using an insulation resistance tester (3154 made by Hioki E.E. Corporation) and measuring one minute after applying 25 V, 100 V, and 1,000 V voltages. 200Ω was the measurement limit for the insulation resistance tester.

Table 1 shows the summary and the evaluation results for the three types of the laminated armored batteries.

TABLE 1

| | | Conductive section of armoring body | | | Battery Weight (g) | Rate of Weight Reduction (%) | Insulation Resistance Value (MΩ) | | |
|---|---|---|---|---|---|---|---|---|---|
| | | Main body | Cover Plate | Tab Lead | | | 25 V | 100 V | 1000 V |
| Ex. 1 | FIG. 1A | Negative electrode | Positive electrode | N/A | 86.64 | 2.04 | >200 | >200 | >200 |
| Ex. 2 | FIG. 2A | Negative electrode | N/A | Positive electrode | 87.09 | 1.53 | >200 | >200 | >200 |
| Comp. Ex. | FIG. 8 | N/A | N/A | Positive electrode, Negative electrode | 88.44 | | >200 | >200 | >200 |

From Table 1, it was confirmed that the weight of the battery could be reduced by forming a conductive section on an armoring body with metal exposed sections. Further, it was confirmed that in any case, the insulation resistance value exceeded 200 MΩ as the measurement limit, and that the insulation resistance of the laminated armoring material was extremely high even if the metal foil layer of the armoring body was used as a conductive body.

[Formability of Laminated Armoring Material and Solderability of Metal Exposed Section]

Using the same materials as each of the layers of laminated armoring materials 1 and 11 used in Examples 1 and 2, and Comparative Example 1, four types of laminated armoring materials of Examples 3 and 4 and Comparative Examples 2 and 3 were produced and their performance characteristics were tested.

In the four types of laminated armoring materials, the materials for each of the layers 2, 3, 4, 5 and 6 were the same, the thickness of the first adhesive agent layer 5 was the same at 3 μm and the thickness of the second adhesive agent layer 6 was the same at 2 μm, but the presence or the absence of the metal exposed sections 7a and 7b and the removal method of the resin layers 2 and 3 were different. Further, the measurement of both the metal exposed sections 7a and 7b and the adhesive agent unapplied sections 8a and 8b was 10 mm×10 mm. Further, in the same way, the adhering of the metal foil layer 4 and the resin layers 2 and 3 was performed using the dry laminating method (see FIG. 6), the applied adhesive agent was dried at 100° C., and after adhering the metal foil layer 4 and the resin layers 2 and 3, it was cured for three days at 40° C. in an aging furnace.

Example 3

A laminated armoring material 1 having metal exposed sections 7a and 7b on both surfaces of the metal foil layer 4 as shown in FIG. 4A was produced. The laminated armoring material 1 had the same structure as the laminated armoring material 1 used as a material for the main body 51 and the cover plate 55 of the armoring body 50 of Example 1.

Using the same method as Example 1, a laminated body 10 for a laminated armoring material having adhesive agent unapplied sections 8a and 8b on both surfaces of the metal foil layer 4 was produced, and YAG laser L was irradiated along the peripheral edge of the adhesive agent unapplied sections 8a and 8b to cut the heat-resistant resin layer 2 and the thermal fusion resin layer 3 to thereby remove the heat-resistant resin layer 2a and the thermal fusion resin layer 3a at the adhesive agent unapplied sections 8a and 8b. At this time, the laser irradiating time needed to cut the resin layers 2 and 3 was 0.5 seconds for each surface.

Example 4

A laminated armoring material 12 having a metal exposed section 7a on only a surface on the heat-resistant resin layer 2 side of the metal foil layer 4 as shown in FIG. 4C was produced.

The laminated armoring material 12 was produced using the following method. First, the adhering on the heat-resistant resin layer 2 side was performed by an adhesive agent unapplied section forming and adhering process, and by applying an adhesive agent on the entire joining surface of the thermal fusion resin layer 3 for adhesion, a laminated body for a laminated armoring material having an adhesive agent unapplied section 8a only on the heat-resistant resin layer 2 side was produced. Next, YAG laser L was irradiated along the peripheral edge of the adhesive agent unapplied section 8a of the laminated body for a laminated armoring material to cut the heat-resistant resin layer 2 to thereby remove the heat-resistant resin layer 2a corresponding to the adhesive agent unapplied section 8a. At this time, the laser irradiating time needed to cut the heat-resistant resin layer 2 was 0.5 seconds.

Comparative Example 2

A laminated armoring material 11 as shown in FIG. 4B was produced. The laminated armoring material 11 did not have a metal exposed section and had the same structure and was made with the same method as the material for the cover plate 72 of the armoring body 70 of Example 2.

Comparative Example 3

On the laminated armoring material 11 produced in Comparative Example 2, the removal of the heat-resistant resin layer 2 and the thermal fusion resin layer 3 was performed to form the metal exposed sections. The metal exposed section on the heat-resistant resin layer 2 side was formed by reciprocating and irradiating YAG laser to a 10 mm×10 mm region of the heat-resistant resin layer 2 and removing the heat-resistant resin layer 2 and the first adhesive agent layer 5. The metal exposed section on the thermal fusion resin layer 3 side was formed using the same method. The metal exposed sections on both surfaces were formed at the same position sandwiching the metal foil layer 4. At this time, the laser irradiation time needed to form the metal exposed section on the heat-resistant resin layer 2 side was 20 seconds, and the laser irradiation time needed to form the metal exposed section on the thermal fusion resin layer 3 side was 20 seconds.

The laminated armoring materials of Comparative Example 3 and Example 3 were similar in that metal exposed sections were provided on both surfaces of the metal foil layer, but the forming methods of the metal exposed sections were different.

(Forming Limit)

The laminated armoring material of Examples 3 and 4, and Comparative Example 3 were cut into A4 size so that the metal exposed section is positioned at the center and used as test materials. The laminated armoring material of Comparative Example 2 was cut into A4 size at an arbitrary position and used as a test material.

For each test material, bulging one step process forming was performed using a punch and a mold used for forming the concave portions on the main body of the armoring body of Example 1. The forming was performed until pinholes and cracks were formed on the laminated armoring material, and the forming depth when pinholes and cracks occurred was determined as the forming limit.

(Solderability)

For Examples 3 and 4, and Comparative Example 3, using a 60% tin-40% lead solder and a soldering iron, an end portion of a nickel plate having a width 5 mm×a length 20 mm×a thickness 0.1 mm was soldered to the metal exposed section on the heat-resistant resin layer 2 side.

For each soldered product, by holding the other end of the nickel plate by hand and pulling until the nickel plate separated from the laminated armoring material, the solderability was evaluated as follows by the breaking position.
○: the metal foil layer broke, and there were no peeling or breaking at the joining section of the metal foil layer and the nickel plate
X: the joining section of the metal foil layer and the nickel plate broke Table 2 shows the summary and the evaluation results of the laminated armoring material.

The difference in formability of Examples 3 and 4 and Comparative Example 3 is determined by the laser irradiation time, and for Comparative Example 3 having a longer irradiation time, it was considered that the formability was reduced due to the deterioration of the laminated armoring material.

Further, it was confirmed that the solderability of the metal exposed section was good.

The present invention claims priority to Japanese Patent Application No. 2014-96478 filed on May 8, 2014, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

INDUSTRIAL APPLICABILITY

The present invention can be suitably used for an electrochemical device which has been made more compact and lighter.

DESCRIPTION OF THE REFERENCE NUMERALS 1, 11, 12 . . . laminated armoring material
2 . . . heat-resistant resin layer
3 . . . thermal fusion resin layer
4 . . . metal foil layer
5 . . . first adhesive agent
6 . . . second adhesive agent
7a, 7b . . . metal exposed section
8a, 8b . . . adhesive agent unapplied section
10 . . . laminated body for a laminated armoring material
31 . . . roll
31a . . . convex portion

TABLE 2

|  |  | Metal Exposed Section | Removal Method of Resin Layer | Laser Irradiation Time On Heat-Resistant Resin Layer Side | Forming Limit | Solderability |
|---|---|---|---|---|---|---|
| Ex. 3 | FIG. 4A | Both surfaces | Irradiating laser on peripheral edge | 0.5 sec. | 12 mm | ○ |
| Ex. 4 | FIG. 4C | Only heat-resistant resin layer | Irradiating laser on peripheral edge | 0.5 sec. | 14 mm | ○ |
| Comp. Ex. 2 | FIG. 4B | none |  |  | 14 mm |  |
| Comp. Ex. 3 |  | Both surfaces | Reciprocating and irradiating within region | 20 sec. | 5 mm | ○ |

By comparing Examples 3 and 4 and Comparative Example 3, it can be understood that the adhered resin layer can be easily removed by an adhesive agent unapplied section forming and adhering process and the metal exposed section can be formed in a short time. Further, Examples 3 and 4 have the same or close to the same formability as Comparative Example 2 which does not have a metal exposed section, which shows that the formability is barely reduced even if a metal exposed section is formed. On the other hand, in Comparative Example 3, the formability was significantly reduced by forming the metal exposed section.

40 . . . first laminated armored battery
41 . . . second laminated armoring material battery
42 . . . third laminated armored battery
43 . . . laminated armored battery
50, 70, 80, 90 . . . armoring body
51, 91 . . . main body
52 . . . concave portion
54, 84 . . . negative electrode conductive section
55, 72 . . . cover plate
56, 83 . . . positive electrode conductive section
60, 65 . . . bare cell 61 . . . positive electrode
62 . . . negative electrode
63 . . . separator
66 . . . positive electrode tab lead
68 . . . negative electrode tab lead
81 . . . first sheet
82 . . . second sheet
83 . . . positive electrode conductive section
84 . . . negative electrode conductive section
L . . . laser

The invention claimed is:

1. An electrochemical device comprising:
a device main body including a plurality of layers of each of a positive electrode and a negative electrode laminated to each other via a separator; and
an armoring body for accommodating the device main body; wherein
the armoring body is constituted by a flat cover plate and a main body each including a laminated armoring material in which a heat-resistant resin layer having a thickness from 9 μm to 50 μm is adhered to a first surface of a metal foil layer and a thermal fusion resin layer having a thickness from 20 μm to 80 μm is adhered to a second surface of the metal foil layer;
the main body of the armoring body has a concave portion for storing the device main body, and a flange that outwardly extends from an opening edge of the concave portion;
the concave portion includes a side surface and a flat bottom surface;
a metal exposed section in which the metal foil layer is exposed is formed on the first surface and the second surface of the metal foil layer as a conductive section;
each of the heat-resistant resin layer, the metal foil layer, and the thermal fusion resin layer of the laminated armoring material is located within the concave portion, forms the concave portion and the flange, and includes a side surface and a flat bottom surface that corresponds to the side surface and the flat bottom surface of the concave portion;
the metal exposed section on the second surface of the metal foil layer is formed at a portion of the flat bottom surface of the concave portion; and
a terminal end of at least one of the positive electrode and the negative electrode of the device main body is joined to the conductive section in the armoring body.

2. The electrochemical device as recited in claim 1, wherein an inside of the armoring body is decompressed.

3. The electrochemical device as recited in claim 1, wherein the metal exposed section on the first surface of the metal foil layer and the metal exposed section on the second surface of the metal foil layer are formed at the same position sandwiching the metal foil layer.

4. The electrochemical device as recited in claim 1, wherein the heat-resistant resin layer of the laminated armoring material is constituted by a stretched film and the thermal fusion resin layer is constituted by an unstretched film.

5. The electrochemical device as recited in claim 1, wherein a chemical conversion film is formed on a surface of the metal foil layer at least on a side of the thermal fusion resin layer.

6. The electrochemical device as recited in claim 1, wherein the thermal fusion resin layer is located at least partially between the metal foil layer and the at least one of the positive electrode and the negative electrode.

* * * * *